United States Patent
Zhao et al.

(10) Patent No.: US 12,002,182 B2
(45) Date of Patent: Jun. 4, 2024

(54) METHODS AND APPARATUSES FOR PROCESSING IMAGE, METHODS AND APPARATUSES FOR TRAINING IMAGE RECOGNITION NETWORK AND METHODS AND APPARATUSES FOR RECOGNIZING IMAGE

(71) Applicants: Beijing Zhongxiangying Technology Co., Ltd., Beijing (CN); BOE Technology Group Co., Ltd., Beijing (CN)

(72) Inventors: Xiaohui Zhao, Beijing (CN); Wangqiang He, Beijing (CN); Libo Zhang, Beijing (CN); Dong Chai, Beijing (CN); Hong Wang, Beijing (CN)

(73) Assignees: Beijing Zhongxiangying Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 370 days.

(21) Appl. No.: 17/490,754

(22) Filed: Sep. 30, 2021

(65) Prior Publication Data
US 2022/0138899 A1    May 5, 2022

(30) Foreign Application Priority Data
Oct. 29, 2020  (CN) .......................... 202011187602.4

(51) Int. Cl.
*G06T 3/40*    (2024.01)
*G06T 3/147*    (2024.01)
(Continued)

(52) U.S. Cl.
CPC ................ *G06T 3/40* (2013.01); *G06T 3/147* (2024.01); *G06T 5/50* (2013.01); *G06T 11/60* (2013.01); *G06T 2207/20081* (2013.01)

(58) Field of Classification Search
None
See application file for complete search history.

(56) References Cited

U.S. PATENT DOCUMENTS 10,628,698 B1 * 4/2020 Pellikka ................ G06T 3/4038
2005/0084175 A1 * 4/2005 Olszak ................. H04N 1/3876
382/284

(Continued)

OTHER PUBLICATIONS

Preibisch, Stephan, Stephan Saalfeld, and Pavel Tomancak. "Globally optimal stitching of tiled 3D microscopic image acquisitions." Bioinformatics 25.11 (2009): 1463-1465. (Year: 2009).*

(Continued)

*Primary Examiner* — Michelle M Entezari Hausmann
(74) *Attorney, Agent, or Firm* — IPro, PLLC (57) ABSTRACT

The present disclosure relates to methods and apparatuses for processing an image, training an image recognition network and recognizing an image. The method of processing an image includes: obtaining a plurality of original images from an original image set, where at least one of the plurality of original images includes an annotation area; obtaining at least one first image by splicing the plurality of original images; for each of the at least one first image, adjusting a shape and/or size of the first image based on the plurality of original images to form a second image; obtaining respective positions of the at least one annotation area in the second image by converting respective positions of the at least one annotation area in the plurality of original images.

15 Claims, 6 Drawing Sheets

(51) Int. Cl.
*G06T 5/50* (2006.01)
*G06T 11/60* (2006.01)

(56) References Cited

U.S. PATENT DOCUMENTS

| | | | |
|---|---|---|---|
| 2005/0200846 A1* | 9/2005 | Hoenig | G06T 7/30 |
| | | | 356/369 |
| 2006/0139475 A1* | 6/2006 | Esch | G08B 13/19623 |
| | | | 348/E5.025 |
| 2009/0208062 A1* | 8/2009 | Sorek | H04N 23/80 |
| | | | 382/313 |
| 2012/0328211 A1* | 12/2012 | Chang | G06T 3/4038 |
| | | | 382/284 |
| 2014/0111605 A1* | 4/2014 | Guo | G06T 3/4038 |
| | | | 348/36 |
| 2017/0289447 A1* | 10/2017 | Nakao | G06T 3/4038 |
| 2018/0082401 A1* | 3/2018 | Bai | G06T 11/60 |
| 2018/0220071 A1* | 8/2018 | Oshima | G06T 3/4038 |
| 2018/0286026 A1* | 10/2018 | Fan | G06T 5/50 |
| 2019/0370949 A1* | 12/2019 | Hutchinson | G06T 3/4038 |
| 2019/0384047 A1* | 12/2019 | Johnson | G06T 7/187 |
| 2020/0410641 A1* | 12/2020 | Hayami | G06T 7/187 |
| 2021/0289134 A1* | 9/2021 | Athreya | G06T 3/4038 |
| 2022/0222932 A1* | 7/2022 | Zhang | G06V 20/695 |
| 2022/0335586 A1* | 10/2022 | Yahashi | G06T 11/00 |

OTHER PUBLICATIONS

Tasdizen, Tolga, et al. "Automatic mosaicking and volume assembly for high-throughput serial-section transmission electron microscopy." Journal of neuroscience methods 193.1 (2010): 132-144. (Year: 2010).*

Turner, Darren, Arko Lucieer, and Christopher Watson. "An automated technique for generating georectified mosaics from ultra-high resolution unmanned aerial vehicle (UAV) imagery, based on structure from motion (SfM) point clouds." Remote sensing 4.5 (2012): 1392-1410. (Year: 2012).*

* cited by examiner

METHODS AND APPARATUSES FOR PROCESSING IMAGE, METHODS AND APPARATUSES FOR TRAINING IMAGE RECOGNITION NETWORK AND METHODS AND APPARATUSES FOR RECOGNIZING IMAGE

CROSS REFERENCE TO RELATED APPLICATIONS

This application claims priority to Chinese Patent Application No. 202011187602.4 entitled "METHODS AND APPARATUSES FOR PROCESSING IMAGE, TRAINING IMAGE RECOGNITION NETWORK AND RECOGNIZING IMAGE" filed on Oct. 29, 2020, the entire content of which is incorporated herein by reference.

TECHNICAL FIELD

The present disclosure relates to the field of image processing technologies, and in particular, to methods and apparatuses for processing an image, methods and apparatuses for training an image recognition network and methods and apparatuses for recognizing an image.

BACKGROUND

With the development of artificial intelligence technology, images can be recognized using a neural network, thereby realizing automatic classification of the images, reducing labor costs and improving recognition efficiency and accuracy. In a production line in a workshop, images of respective products in various manufacturing processes are captured and input into an image recognition network. Based on a recognition result of an image by the image recognition network, it is determined whether a product corresponding to the image is defective and further a specific type of the defect. The image recognition network is trained using a large number of annotated images, and once an image acquisition device in the production line changes, images need to be reacquired and annotated to train an image recognition network.

SUMMARY

The present disclosure provides methods and apparatuses for processing an image, training an image recognition network and recognizing an image, so as to solve deficiencies in the related art.

According to a first aspect of the embodiments of the present disclosure, there is provided a method of processing an image, including: obtaining a plurality of original images from an original image set, wherein at least one of the plurality of original images includes an annotation area; obtaining at least one first image by splicing the plurality of original images; for each of the at least one first image, adjusting a shape and/or size of the first image based on the plurality of original images to form a second image; obtaining respective positions of the at least one annotation area in the second image by converting respective positions of the at least one annotation area in the plurality of original images.

In an embodiment, the original image set includes a plurality of process subsets, each of the process subsets includes a plurality of type nodes, each of the type nodes includes a multitude of original images, and annotation areas of original images in each of the type nodes are annotated with labels corresponding to the type node; and obtaining the plurality of original images from the original image set includes: obtaining the plurality of original images from a same type node in a same process subset, or obtaining the plurality of original images from different type nodes in a same process subset, or obtaining the plurality of original images from same type of type nodes in different process subsets.

In an embodiment, original images in one type node of each of the process subsets are unannotated images.

In an embodiment, obtaining the plurality of original images from the original image set includes: obtaining $N^2$ original images, wherein N is an integer greater than or equal to 2.

In an embodiment, obtaining the at least one first image by splicing the plurality of original images includes: in response to spaces corresponding to the plurality of original images being unoverlapped, forming the at least one first image by arranging the plurality of original images into N rows and N columns and splicing; in response to spaces corresponding to two or more of the plurality of original images being overlapped, forming the at least one first image by superposing duplicate areas of the two or more of the plurality of original images.

In an embodiment, adjusting the shape and/or size of the first image based on the plurality of original images to form the second image includes: determining a scaling ratio of an annotation area in the plurality of original images and an annotation area in the second image according to a parameter of an image acquisition device corresponding to the plurality of original images and a parameter of an image acquisition device corresponding to the second image; scaling the first image based on the scaling ratio to form a third image; adjusting a shape and/or size of the third image to be consistent with those of the plurality of original images to form the second image.

In an embodiment, adjusting the shape and/or size of the third image to be consistent with those of the plurality of original images to form the second image includes: padding the third image and/or cropping the third image to form the second image in a shape and size consistent with the plurality of original images.

In an embodiment, obtaining respective positions of the at least one annotation area in the second image by converting respective positions of the at least one annotation area in the plurality of original images includes: for each of the at least one annotation area, obtaining coordinates of the annotation area in the first image by converting coordinates of the annotation area in the plurality of original images; obtaining coordinates of the annotation area in the third image by converting the coordinates of the annotation area in the first image; obtaining coordinates of the annotation area in the second image by converting the coordinates of the annotation area in the third image.

In an embodiment, obtaining the coordinates of the annotation area in the first image by converting the coordinates of the annotation area in the plurality of original images includes: in response to spaces corresponding to the plurality of original images being unoverlapped, obtaining coordinates of the annotation area in a first coordinate system of the first image by converting the coordinates of the annotation area in the plurality of original images, wherein, the first coordinate system takes a center of the first image as an origin; in response to spaces corresponding to two or more of the plurality of original images being overlapped, obtaining coordinates of the annotation area in a second coordinate system of the first image by converting the coordinates of the annotation area in the plurality of original images, wherein, the second coordinate system takes a center of duplicate area as an origin.

In an embodiment, obtaining the coordinates of the annotation area in the second image by converting the coordinates of the annotation area in the third image includes: obtaining coordinates of the annotation area in a third coordinate system by converting coordinates of the annotation area in the first coordinate system scaled or the second coordinate system scaled, wherein the third coordinate system takes an upper left corner of the second image as an origin.

According to a second aspect of the embodiments of the present disclosure, there is provided a method of training an image recognition network, including: training the image recognition network using an image training set, wherein images in the image training set are processed using the methods of processing an image as described in the first aspect.

According to a third aspect of the embodiments of the present disclosure, there is provided a method of recognizing an image, including: recognizing an image by using an image recognition network, wherein the image recognition network is trained using the training method described in the second aspect.

According to a fourth aspect of the embodiments of the present disclosure, there is provided an apparatus for processing an image, including: an acquisition module, configured to obtain a plurality of original images from an original image set, wherein at least one of the plurality of original images includes an annotation area; a splicing module, configured to obtain at least one first image by splicing the plurality of original images; an adjustment module, configured to for each of the at least one first image, adjust a shape and/or size of the first image based on the plurality of original images to form a second image; a position determining module, configured to obtain respective positions of the at least one annotation area in the second image by converting respective positions of the at least one annotation area in the plurality of original images.

In an embodiment, the original image set includes a plurality of process subsets, each of the process subsets includes a plurality of type nodes, each of the type nodes includes a multitude of original images, and annotation areas of original images in each of the type nodes are annotated with labels corresponding to the type node; the acquisition module is configured to: obtain the plurality of original images from a same type node in a same process subset, or obtain the plurality of original images from different type nodes in a same process subset, or obtain the plurality of original images from same type of type nodes in different process subsets.

In an embodiment, original images in one type node of each of the process subsets are unannotated images.

In an embodiment, the acquisition module is configured to obtain $N^2$ original images, wherein N is an integer greater than or equal to 2.

In an embodiment, the splicing module is configured to: in response to spaces corresponding to the plurality of original images being unoverlapped, form the at least one first image by arranging the plurality of original images into N rows and N columns and splicing; in response to spaces corresponding to two or more of the plurality of original images being overlapped, form the at least one first image by superposing duplicate areas of the two or more of the plurality of original images.

In an embodiment, the adjustment module is configured to: determine a scaling ratio of an annotation area in the plurality of original images and an annotation area in the second image according to a parameter of an image acquisition device corresponding to the plurality of original images and a parameter of an image acquisition device corresponding to the second image; scale the first image based on the scaling ratio to form a third image; adjust a shape and/or size of the third image to be consistent with those of the plurality of original images to form the second image.

In an embodiment, when adjusting the shape and/or size of the third image to be consistent with those of the plurality of original images to form the second image, the adjustment module is configured to: pad the third image and/or crop the third image to form the second image in a shape and size consistent with the plurality of original images.

In an embodiment, the position determining module is configured to: for each of the at least one annotation area, obtain coordinates of the annotation area in the first image by converting coordinates of the annotation area in the plurality of original images; obtain coordinates of the annotation area in the third image by converting the coordinates of the annotation area in the first image; obtain coordinates of the annotation area in the second image by converting the coordinates of the annotation area in the third image.

In an embodiment, when obtaining the coordinates of the annotation area in the first image by converting the coordinates of the annotation area in the plurality of original images, the position determining module is configured to: in response to spaces corresponding to the plurality of original images being unoverlapped, obtain coordinates of the annotation area in a first coordinate system of the first image by converting the coordinates of the annotation area in the plurality of original images, wherein, the first coordinate system takes a center of the first image as an origin; in response to spaces corresponding to two or more of the plurality of original images being overlapped, obtain coordinates of the annotation area in a second coordinate system of the first image by converting the coordinates of the annotation area in the plurality of original images, wherein, the second coordinate system takes a center of duplicate area as an origin.

In an embodiment, when obtaining the coordinates of the annotation area in the second image by converting the coordinates of the annotation area in the third image, the position determining module is configured to: obtain coordinates of the annotation area in a third coordinate system by converting coordinates of the annotation area in the first coordinate system scaled or the second coordinate system scaled, wherein the third coordinate system takes an upper left corner of the second image as an origin.

According to a fifth aspect of the embodiments of the present disclosure, there is provided an apparatus for training an image recognition network, including: a training module configured to train the image recognition network using an image training set, wherein images in the image training set are processed using the methods of processing an image as described in the first aspect.

According to a sixth aspect of the embodiments of the present disclosure, there is provided an apparatus for recognizing an image, including: a recognition module, configured to recognize an image by using an image recognition network, wherein the image recognition network is trained using the training method as described in the second aspect.

According to a seventh aspect of the embodiments of the present disclosure, there is provided a device, the device includes a memory and a processor. The memory is configured to store computer instructions executable on the processor. And the processor is configured to execute the computer instructions to process an image based on the methods described in the first aspect, train an image recognition network based on the method described in the second aspect, or recognize an image based on the method described in the third aspect.

According to an eighth aspect of the embodiments of the present disclosure, there is provided a non-volatile computer-readable storage medium having a computer program stored thereon, wherein when the program is executed by a processor to implement the methods described in the first aspect, the second aspect, or the third aspect.

It should be understood that the above general description and the following detailed description are only exemplary and explanatory, and cannot limit the present disclosure.

BRIEF DESCRIPTION OF DRAWINGS

The accompanying drawings herein are incorporated in and constitute a part of this specification, illustrate embodiments consistent with the present disclosure, and together with the description serve to explain the principles of the disclosure.

DETAILED DESCRIPTION

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any or all possible combinations of one or more associated listed items.

It should be understood that although the terms "first", "second", "third" and the like may be used in the present disclosure to describe various information, these information should not be limited to these terms. These terms are only used to distinguish information of the same type from each other. For example, without departing from the scope of the present disclosure, first information may also be referred to as second information, and similarly, the second information may also be referred to as the first information. Depending on the context, the word "if" as used herein may be interpreted as "when" or "in response to".

Figure 1:
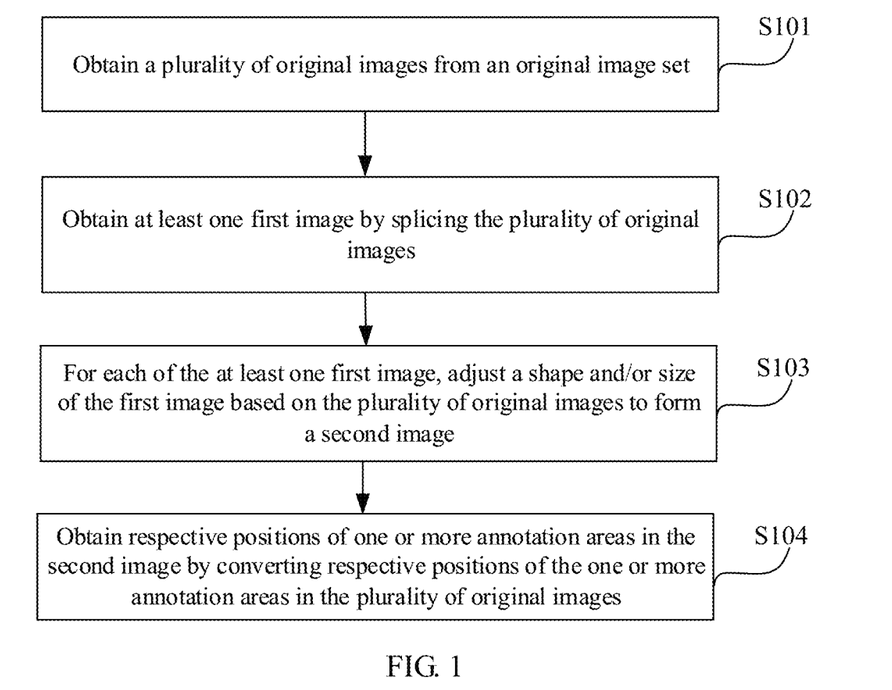
FIG. 1 is a flowchart of a method of processing an image according to an embodiment of the present disclosure.

At least one embodiment of the present disclosure provides a method of processing an image. Referring to FIG. 1, a flowchart of the method of processing an image is shown, including step S101 to step S104.

Images to which the method of processing an image is directed can be used to train an image recognition network, and images processed by the method of processing an image can also be used to train an image recognition network. An image recognition network trained using the images before processing can recognize other images before processing, and an image recognition network trained using the images after processing can recognize other images after processing. The method of processing an image can process a single image (i.e., generate a second image), or process a plurality of images in batch (i.e., generate a plurality of second images simultaneously). A large number of generated second images constitute an image training set, and then the image training set can be used to train an image recognition network.

In step S101, a plurality of original images are obtained from an original image set, where at least one of the plurality of original images includes one or more annotation areas.

The original image set can be used to train an image recognition network, and the trained image recognition network can recognize annotation areas in original images of the original image set. And for new images acquired by an image acquisition device corresponding to the original images, annotation areas in the new images can also be recognized by the trained image recognition network. That is to say, a large number of images are acquired by an image acquisition device, and respective annotation areas of the images are annotated to form original images. These original images constitute an original image set. An image recognition network is trained using the original image set, then the same image acquisition device is used to acquire new images as to-be-recognized images, and the to-be-recognized images can be recognized by the image recognition network. However, once a new image acquisition device is used to acquire new to-be-recognized images, the new to-be-recognized images cannot be accurately recognized by the image recognition network. Therefore, a new image recognition network needs to be trained using an image training set corresponding to the new to-be-recognized images. The original images obtained in this step are used to subsequently generate a new image training set.

The annotation areas of the original images are annotated with different labels, and the label matches the content of the annotation area. That is, an annotation area is annotated with a corresponding label according to a content of the annotation area. Therefore, the image recognition network trained using the original image set can recognize whether each of to-be-recognized images includes an annotation area, and further classify the annotation area according to the label. An annotation manner of the annotation areas may be manual annotation, or may be performed by using a trained image recognition network.

In an example, the image recognition network can be an Automated Detection Classification (ADC) system for images showing defect of product based on deep learning, which is applied in a screen production process. The image recognition network needs a large number of images as a training set, and the number of the images in the training set has a great influence on the overall effect of a model. Correspondingly, the image acquisition device can be an Automated Optical Inspection (AOI) device in the production line. An annotation area in an image is a defect area in a captured image of a screen, that is, an unqualified area in the screen, and different defects have corresponding labels. In addition, an annotation area in an image can further be another area used for classification in a captured image of a screen, such as an area that is used to determine screen category, batch, or quality. Different categories have corresponding labels, different batches have corresponding labels, and different qualities have corresponding labels. Device changes or production process improvements in the production line may cause images captured by the AOI device to change significantly from previous images. For example, changing an optical lens of the AOI device causes a focal length of the device to be shortened, which causes a size of a defect area in a captured image being reduced by several times. However, it is difficult for an existing ADC system to detect defect areas in newly captured images, which may easily lead to missed detection, thus affecting the subsequent process flow and the product yield rate.

In step S102, at least one first image is obtained by splicing the plurality of original images.

In this step, each of the at least one first image is obtained by splicing the plurality of original images. Therefore, the first image combines contents and information included in the plurality of original images. For example, the first image combines at least one annotation area included in the plurality of original images.

In an example, among the plurality of original images, only one original image includes an annotation area, and the annotation area is annotated with a corresponding label. Therefore, the first image also includes the annotation area, and the annotation area is annotated with the corresponding label.

In step S103, for each of the at least one first image, a shape and/or size of the first image is adjusted based on the plurality of original images to form a second image.

Compared with the original images, images captured by a new image acquisition device have changed a lot. The main reason is that the change of a focal length and other parameters causes a field of view to change, which in turn causes a proportion of an annotation area and other contents in an image to change. For example, an annotation area in an original image can occupy 20% of a total area of the original image, when the field of view becomes larger, the space that can be captured becomes larger, and as a result, the anno-tation area occupies 10% of a total area of a captured image. Compared with the original images, the size and resolution of the images captured by the new image acquisition device can be unchanged.

In an example, in a screen production line, device changes or production process improvements can cause the field of view captured by the AOI device to become larger, and a ratio of a defect area to a total area of a captured image becomes smaller. When the size and resolution of the image do not change, the size of the defect area becomes smaller.

In step S104, respective positions of the one or more annotation areas in the second image are obtained by converting respective positions of the one or more annotation areas in the plurality of original images.

Respective labels of the one or more annotation areas in the original images can be directly mapped on the second image. Respective positions of the one or more annotation areas in the original images can be converted in combination with the step S102 of splicing to obtain the first image and the step S103 of determining the second image, such that respective positions and respective labels of the one or more annotation areas in the second image are determined. Therefore, the second image becomes an image that can be directly used to train an image recognition network.

In the embodiments of the present disclosure, at least one first image can be obtained by splicing a plurality of original images in an original image set, and for each of the at least one first image, a shape and/or size of the first image can be further adjusted based on the plurality of original images to form a second image. The second image not only combines contents and information included in the plurality of original images, but also matches a shape and/or size of the original images. Furthermore, by determining respective positions of one or more annotation areas in the second image, the one or more annotation areas can be mapped to the second image, such that the second image also includes the one or more annotation areas. And respective labels of the one or more annotation areas in the second image and respective labels of the original images forming the second image are the same. Therefore, the second image can further be used for training an image recognition network. That is, when an image acquisition device that acquires the original images is replaced with an image acquisition device corresponding to the second image, there is no need to reacquire images, but instead, a new second image set can be directly generated by using the original image set. Therefore, the generation efficiency and quality of a new image set can be improved, and the efficiency and quality of network training, image recognition and defect detection can be further improved.

For example, when the images captured by the AOI device change due to the device replacements or the production process improvements in the screen production line, in order to retrain the ADC system, data can be collected, annotated and cleaned again. This process takes a long time, usually several weeks or even months, and the factory needs to deploy a large number of personnel for manual annotation to annotate the annotation areas in the original images with different labels, which is time-consuming and inefficient. Using the methods of processing an image provided by the embodiments of the present disclosure, the generation of new image data set can be quickly completed with the existing image set, a new model can be quickly trained and ready for use, the risk of missed detection can be reduced, and the product yield rate can be maintained. The methods can further improve the screen production capacity of the factory.

Figure 2:
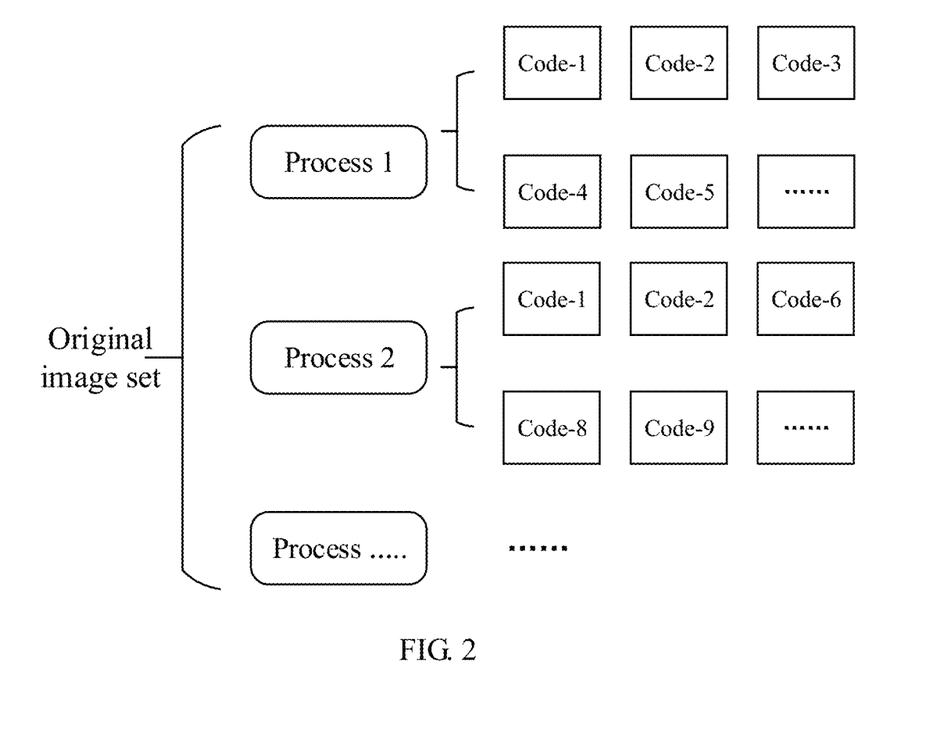
FIG. 2 is a schematic diagram of a storage form of an original image set according to an embodiment of the present disclosure.

In some embodiments of the present disclosure, the original images in the original image set can be stored in a hierarchical storage manner, for example, a two-level storage manner of the original images in the original image set shown in FIG. 2. The original image set includes a plurality of process subsets. Each of the process subsets includes a plurality of type nodes, each of the type nodes includes a plurality of original images, and annotation areas of original images in each of the type nodes are annotated with labels corresponding to the type node. For example, each of original images stored in a type node "Code-2" of a process subset "Process 1" is annotated with position coordinates of an annotation area and a label corresponding to the type node, that is, "Process 1, Code-2". For another example, the original images in the original image set can be stored in three levels: process-product model-type, and the present disclosure does not intend to limit the number of levels of the hierarchical storage.

Original images in one type node of each of the process subsets are unannotated images. That is to say, each process subset includes a special type node, original images in this type node do not include annotation areas. Thus the original images are only annotated with corresponding labels and without the positions of the annotation areas. For example, original images in Code-8 of Process 2 in FIG. 2 are all unannotated images, so each original image in Code-8 is only annotated with a label "Process 2, Code-8".

In an example, in the original image set used to train the ADC system in the screen production line, each of process subsets is used to store images captured at a production site in the production line. Images involving different defects and captured at the production site are stored in different type nodes of the process subset, and images that do not involve defects and captured at the production site are stored in the above-mentioned special unannotated type node. If one original image involves multiple defects of different types, the impact of influence of the multiple defects of different types on the product yield in the screen production line is determined first, and the original image is stored in a type node corresponding to a defect that has a greatest influence on the product yield.

Based on the storage manner of the original image set described above, any of the following manners can be used to obtain the plurality of original images in the original image set.

A first manner is to obtain a plurality of original images from a same type node in a same process subset.

The plurality of original images obtained in this manner involve a same kind of defect, such that each of at least one image generated based on the plurality of original images can involve one or more defects of the same kind. Thus the at least one image generated can be used to train an image recognition network to recognize the defect of this kind, and at least part of the at least one image generated involves a plurality of defects of the same type, which can improve the training efficiency and accuracy. Since the original images are actual data of the production line, this manner not only retains an actual data form of the production line, but also meets demands for new data.

A second manner is to obtain the plurality of original images from different type nodes in a same process subset.

The plurality of original images obtained in this manner can involve a variety of defects, such that each of at least one image generated based on the plurality of original images can involve a variety of defects. Thus the at least one image generated can be used to train an image recognition network to recognize the variety of defects, which can improve the training efficiency and accuracy. Since the original images are actual data of the production line, this manner not only retains an actual data form of the production line, but also meets demands for new data.

In an example, one original image is obtained from one type node in a process subset corresponding to the same site, and the original image includes an annotation area, and then a plurality of original images are obtained from another type node in the process subset corresponding to the same site. And none of the plurality of original images includes an annotation area, so all original images obtained in this example altogether only involve one defect.

A third manner is to obtain the plurality of original images from same type of type nodes in different process subsets.

The plurality of original images obtained in this manner can involve a same kind of defect in a plurality of processes, which can greatly improve the anti-interference ability of the image recognition network and reduce the misjudgement rate of the image recognition network.

In an example, obtaining the plurality of original images from the original image set can include: obtaining $N^2$ original images, where N is an integer greater than or equal to 2, so as to facilitate the generation of the first image.

In the embodiments of the present disclosure, the management accuracy of the original images is increased through the storage manner in terms of the processes and types, thereby facilitating the acquisition of a plurality of original images as required, and improving the distribution accuracy and control accuracy of the acquired original images. Therefore, the subsequent generated first images can be precisely controlled, and the information included in the generated first images can be balanced, and dense abnormalities/defects in the first images can be avoided, thereby improving the quality of the trained image recognition network.

In some embodiments of the present disclosure, obtaining the at least one first image by splicing the plurality of original images can include: in response to spaces corresponding to the plurality of original images being unoverlapped, forming the at least one first image by arranging the plurality of original images into N rows and N columns and splicing; in response to spaces corresponding to two or more of the plurality of original images being overlapped, forming the at least one first image by superposing overlapped areas/duplicate areas of the two or more of the plurality of original images.

When spaces corresponding to the plurality of original images are unoverlapped, the plurality of original images can be directly spliced. The first image can be obtained by splicing images arranged in a matrix with the same number of rows and columns, such that length and width of the first image are increased by a same factor compared with the original image. Therefore, the shape of the first image is the same as that of the original images, thereby simplifying subsequent operations of adjusting the shape and size of the first image. When splicing, positions of the plurality of original images can be arranged and combined in many manners, that is, a plurality of first images can be obtained by splicing the plurality of original images. For example, $A_i^i$ situations can be presented, that is, $A_i^i$ first images can be obtained by splicing the original images, where i represents the number of the original images. For example, when four original images A, B, C, and D are spliced to form first images, 24 kinds of arrangement situations can be presented, that is, 24 first images can be obtained by splicing.

When spaces corresponding to two or more of the plurality of original images are overlapped, that is to say, if the plurality of original images have overlapped parts, the plurality of original images cannot be directly spliced. If the plurality of original images are directly spliced, an overlapped area/duplicate area will be repeatedly displayed in the first image, so deduplication operation and alignment operation are needed. For example, overlapped areas/duplicate areas of the plurality of original images are superposed to form the first image. The overlapped/duplicate area may exist on each of the plurality of original images, or may exist on at least two of the plurality of images, and all original images with the overlapped/duplicate areas may be superposed. For example, the first image can be formed by splicing four original images A, B, C, and D, where the original image A and the original image B have overlapped/duplicate areas, and the original image C and the original image D have overlapped/duplicate areas. Therefore, the overlapped/duplicate areas of the original image A and the original image B are to be superposed to form a combined image AB, the overlapped/duplicate areas of the original image C and the original image D are to be superposed to form a combined image CD, and then the combined image AB and the combined image CD can be spliced to form the first image. There are two cases for the plurality of original images with overlapped/duplicate areas: a first case is that the overlapped/duplicate areas are at the edges of the original images; and a second case is that the overlapped/duplicate areas are inside the original images (that is, the non-edge part). The operations of superposing images in both cases are described in detail below.

Figure 3:
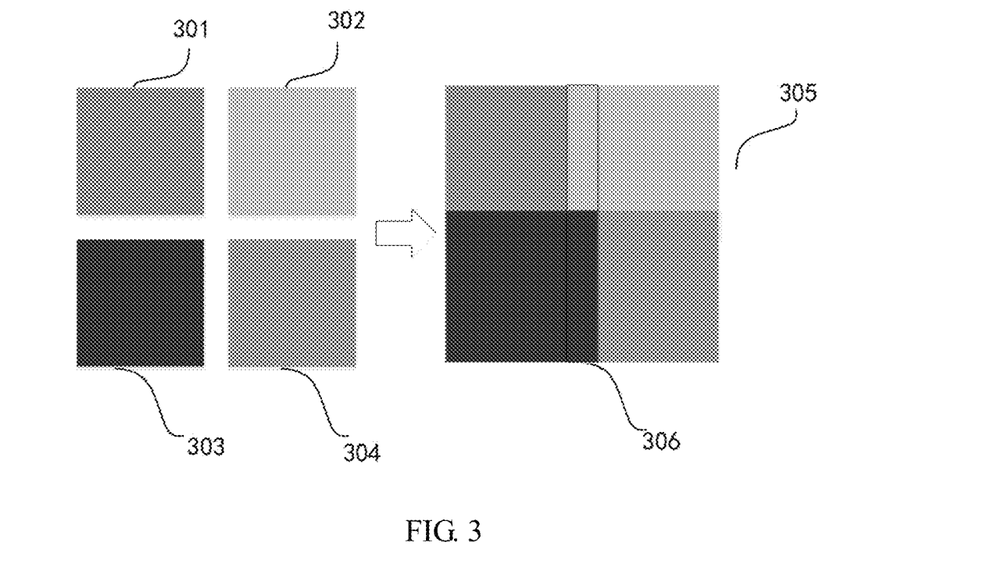
FIG. 3 is a schematic diagram of a process in which a first image is obtained by splicing according to an embodiment of the present disclosure.

In the first case, referring to FIG. 3, a first image 305 is formed by splicing four original images 301, 302, 303, and 304, where, each of the original images 301 and 302 has an overlapped area/duplicate area, and each of the original images 303 and 304 has an overlapped area/duplicate area. The overlapped/duplicate areas of the original images 301 and 302 are at a right edge of the original image 301 and a left edge of the original image 302 respectively, and the overlapped/duplicate areas of the original images 303 and 304 are at a right edge of the original image 303 and a left edge of the original image 304 respectively. Therefore, the overlapped/duplicate areas of the original images 301 and 302 are superposed to form a combined image, the overlapped/duplicate areas of the original images 303 and 304 are superposed to form a combined image, and the two combined images are spliced to form the first image 305. There is an overlapped/duplicate area 306 in the middle of the first image 305. Although the first image spliced in this manner is still a regular image, such as a rectangular image, the aspect ratio of the image is changed, so the shape and size is to be adjusted in the subsequent steps.

Figure 4:
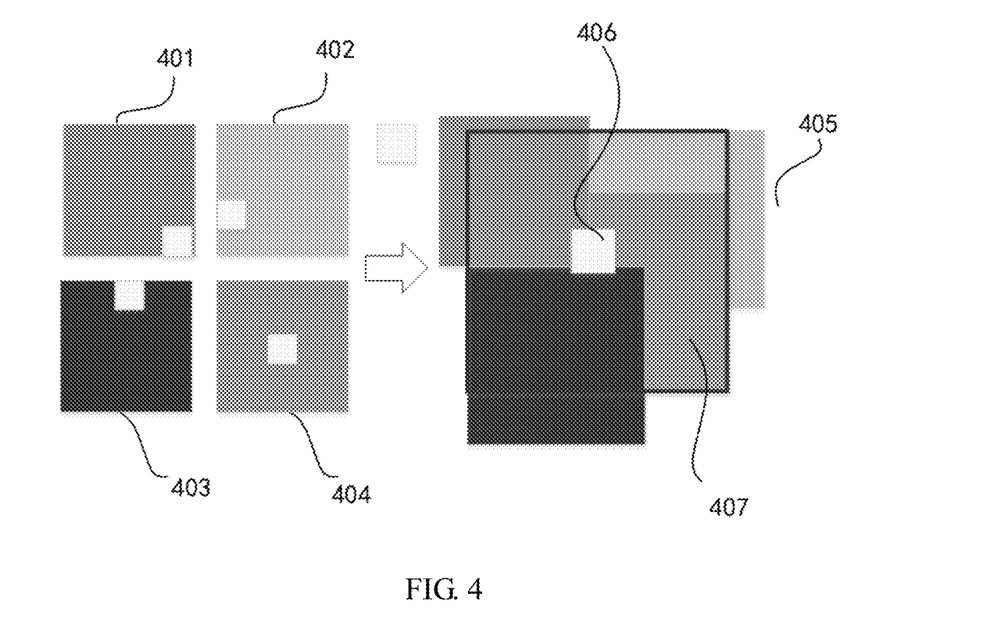
FIG. 4 is a schematic diagram of another process in which a first image is obtained by splicing according to an embodiment of the present disclosure.

In the second case, referring to FIG. 4, a first image 405 is formed by splicing four original images 401, 402, 403, and 404, where each of the original images 401, 402, 403, and 404 has an overlapped/duplicate area 406, and the duplicate area is in the middle part of the original images 401, 402, 403, and 404, respectively. Therefore, the duplicate areas 406 of the four original images are superposed to form the first image 405. During the superposing process, an original image is covered by one or more original images located above, and therefore, the four original images are to be superposed according to image layer priorities of the four original images. The image layer priorities are based on a principle of not covering annotation areas. In addition, a plurality of superposing situations can be presented in a manner of arrangement and combination. The first image spliced in this manner is not regular, and the proportional relationship of respective sides is irregular, therefore, the shape and size is to be adjusted in the subsequent steps.

In the embodiments of the present disclosure, for a plurality of original images with no overlapped/duplicate area and a plurality of original images with different overlapped conditions, different splicing manners are used to form the at least one first image, respectively. Therefore, the similarities between the at least one first image and the original images can be ensured as much as possible, the at least one annotation area of the original images can be reserved and the subsequent adjustment steps can be simplified. It should be noted that, in the present disclosure, whether the spaces corresponding to two or more of the original images are overlapped is determined based on the image recognition technologies. The specific implementation can refer to related technologies, which will not be described in detail here.

Figure 5:
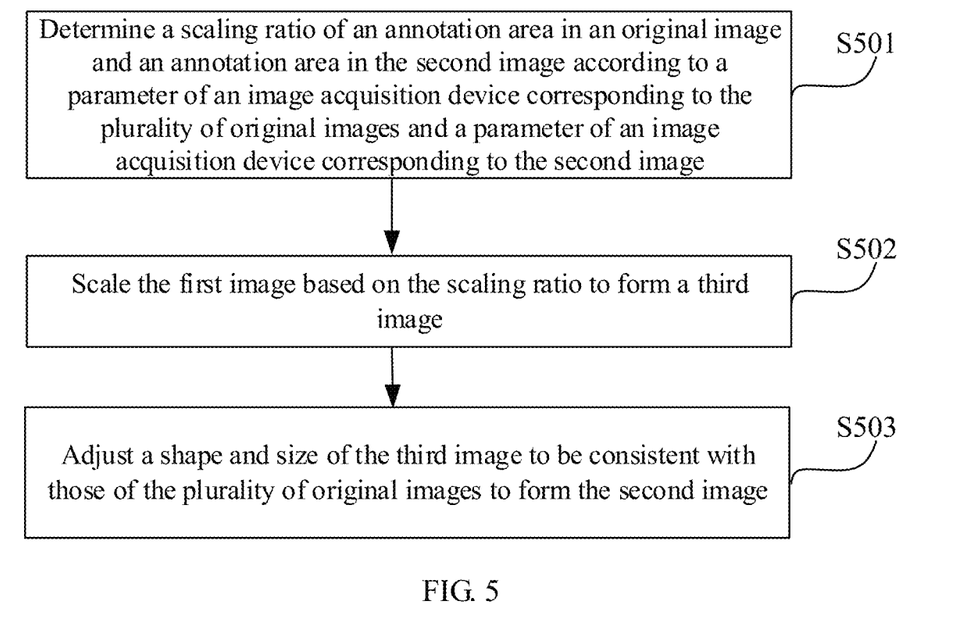
FIG. 5 is a flowchart of determining a second image according to an embodiment of the present disclosure.

In some embodiments of the present disclosure, the shape and/or size of the first image can be adjusted according to the original images by using the following manners, so as to form the second image. Please refer to FIG. 5, FIG. 5 shows a process of the above adjustment method, including step S501 to step S503.

In step S501, a scaling ratio of an annotation area in an original image and an annotation area in the second image is determined according to a parameter of an image acquisition device corresponding to the plurality of original images and a parameter of an image acquisition device corresponding to the second image.

The image acquisition device corresponding to the original images may be an image acquisition device for acquiring the original images, and the image acquisition device corresponding to the second image may be an image acquisition device for acquiring the second image. For example, the image acquisition device corresponding to the original images and the image acquisition device corresponding to the second image may be AOI devices before and after the device replacements or production process improvements, respectively.

Figure 6:
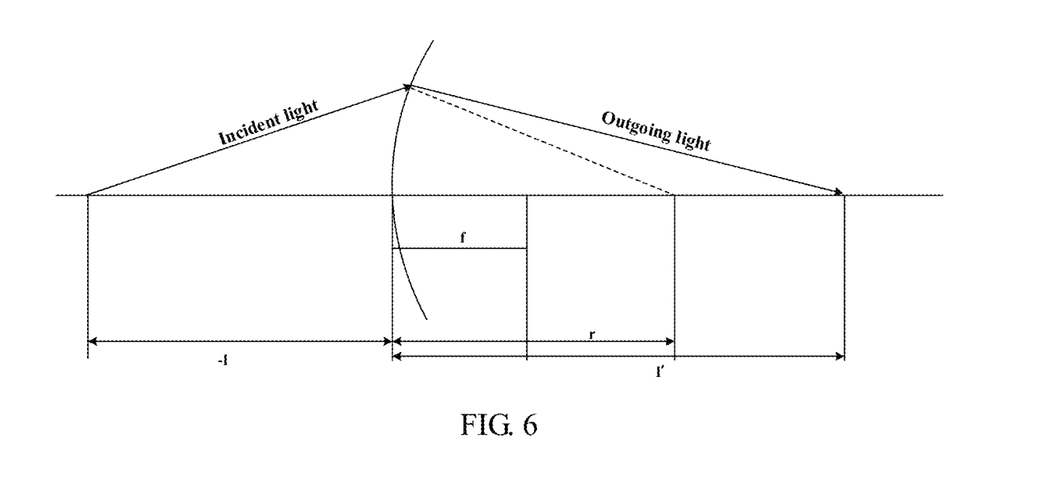
FIG. 6 is a structural schematic diagram of an optical system corresponding to an image acquisition device according to an embodiment of the present disclosure.

A scaling ratio of an annotation area is equal to a scaling ratio of a space corresponding to an image, and it is accurate to use the annotation area as a ruler to measure the scaling ratio of the space. When calculating a scaling ratio, an imaging process of the image acquisition device can be simplified to an optical system shown in FIG. 6, where l represents an object distance, and l' represents an image distance. For the image acquisition device corresponding to the original images, the object distance is set as $l_1$, the image distance is set as $l_1'$, and a focal length $f_1$ is approximately equal to half of a curvature radius $r_1$ of a lens (for example, a convex lens), that is, $f_1=r_1/2$. The above optical system is approximately regarded as an ideal optical system. According to the Gaussian formula, a following formula of the image acquisition device corresponding to the original images can be obtained:

$$\frac{1}{l_1'}+\frac{1}{l_1}=\frac{2}{r_1}$$

Similarly, the image acquisition device corresponding to the second image satisfies a following formula:

$$\frac{1}{l_2'}+\frac{1}{l_2}=\frac{2}{r_2}$$

where, the object distance is $l_2$, the image distance is $l_2'$, and a focal length $f_2$ is approximately equal to half of a curvature radius $r_2$ of a lens (a convex lens), that is, $f_2=r_2/2$.

There is a linear relationship between the curvature radius $r_2$ of the image acquisition device corresponding to the second image and the curvature radius $r_1$ of the image acquisition device corresponding to the original images, so let:

$$t = \frac{r_2}{r_1}$$

For example, in a scenario where an image acquisition device is changed in the screen production line, the replacement of the image acquisition device will cause a change in the curvature radius, but the object distance will not be changed, that is, $l_1=l_2$, so it can be obtained according to the above formulas:

$$l_2' = \frac{tl_1 l_1'}{l_1 + l_1'(1-t)}$$

According to a lateral magnification formula of the optical system, following formulas can be obtained:

$$\beta_1 = \frac{nl_1'}{n'l_1}$$

$$\beta_2 = \frac{nl_2'}{n'l_2}$$

In an actual imaging process, n=n', after an original product is imaged by the new image acquisition device, a scaling factor k is:

$$k = \frac{\beta_2}{\beta_1} = \frac{tl_1'}{l_1 + l_1'(1-t)}$$

That is, the spatial range corresponding to the second image is k times the spatial range corresponding to the original images, that is, the annotation area of the second image is k times smaller than the annotation area of the first image. For example, the size of the defect area in the captured image is scaled by k times due to the change of new processes and new device in factories.

In step S502, the first image is scaled based on the scaling ratio to form a third image.

In this step, the first image is scaled using the scaling ratio of the annotation area, and the annotation area in the obtained third image meets the size requirements of the image acquisition device corresponding to the second image (for example, the image acquisition device AOI after replacement, etc.). For example, an annotation area in an original image occupies 200*200 pixels, and an annotation area in the second image occupies 100*100 pixels, such that the scaling ratio k is 0.5. Therefore, the obtained first image is reduced by half to obtain the third image, and the annotation area in the third image occupies 100*100 pixels. However, the size and shape of the third image do not necessarily meet the requirements of the image acquisition device corresponding to the second image, so further adjustment is needed.

In step S503, a shape and size of the third image are adjusted to be consistent with those of the plurality of original images to form the second image.

In this step, padding of the third image can be performed and/or the third image can be cropped to form the second image in a shape and size consistent with the plurality of original images. There are corresponding adjustment manners for the several manners of splicing to form the first image, which will be described in detail below.

In the first manner of splicing to form the first image, the plurality of original images have no overlapped/duplicate area. The plurality of original images are directly arranged into a matrix with equal number of rows and columns, and then spliced into the first image, so the shape of the first image is the same as that of the original images. Therefore, if the reciprocal of the scaling ratio of the above-mentioned annotation area is an integer N, then $N^2$ original images can be obtained when obtaining original images. The first image can be obtained by splicing the original images in N rows and N columns, and the first image is reduced by a factor of N according to the scaling ratio. The size and shape of the third image formed are the same as those of the original images. However, if $N^2$ images are not obtained when obtaining original images, the size of the third image obtained is larger or smaller than that of the original images. When the size of the third image obtained is larger than that of the original images, the third image is cropped, and when the size of the third image obtained is smaller than that of the original images, padding of the third image is performed. That is, pixel points with brightness of 0 or 1 are added around the third image. In addition, if the reciprocal of the scaling ratio of the above-mentioned annotation area is not an integer and a nearest integer to the reciprocal of the scaling ratio is N, then $N^2$ images can be obtained when obtaining original images. When the size of the third image obtained is larger than that of the original images, the third image is cropped, and when the size of the third image obtained is smaller than that of the original images, padding of the third image is performed.

In the second manner of splicing to form the first image, the plurality of original images have duplicate areas, and each of the duplicate areas is at an edge of a corresponding original image. The first image obtained is shown in FIG. 3, the shape of the first image is a rectangular shape, but the aspect ratio of the first image is different from that of the original images. Therefore, when the length and width of the third image are both larger than those of the original images, the third image can be cropped. When the length and width of the third image are both smaller than those of the original images, padding of the third image can be performed. When the length of the third image is larger than that of the original images and its width is smaller than that of the original images, the third image can be cropped in a length direction and padding of the third image can be performed in a width direction. When the width of the third image is larger than that of the original images and its length is smaller than that of the original images, the third image can be cropped in the width direction and padding of the third image can be performed in the length direction.

In the third manner of splicing to form the first image, the plurality of original images have duplicate areas. And each of the duplicate areas is located in the middle part of a corresponding original image. The obtained first image with an irregular shape is shown in FIG. 4. Therefore, firstly, the shape of the third image can be made regular by cropping or padding. When cropping, the innermost edge on each of four sides of the third image is used as a cropped boundary. For example, a regular image 407 can be obtained by cropping in FIG. 4. When padding, the outermost edge on each of the four sides of the third image is used as a padding boundary. After adjusting the third image to a regular rectangle, adjust the size of the third image according to the second adjustment manner, so as to make it equal to the size of the original images.

Figure 7:
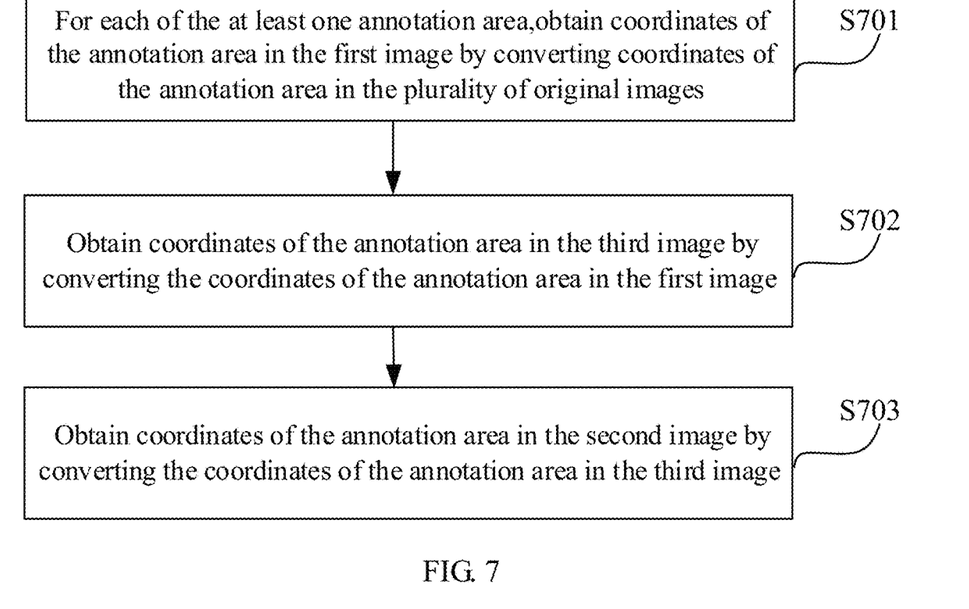
FIG. 7 is a flowchart of converting coordinates of an annotation area according to an embodiment of the present disclosure.

In some embodiments of the present disclosure, respective positions of the at least one annotation area in the second image can be obtained by converting respective positions of the at least one annotation area in the original images in the following manner. Please refer to FIG. 7, FIG. 7 shows a flowchart of the above-mentioned manner, including step S701 to step S703.

In step S701, for each of the at least one annotation area, coordinates of the annotation area in the first image are obtained by converting coordinates of the annotation area in the plurality of original images.

Figure 8:
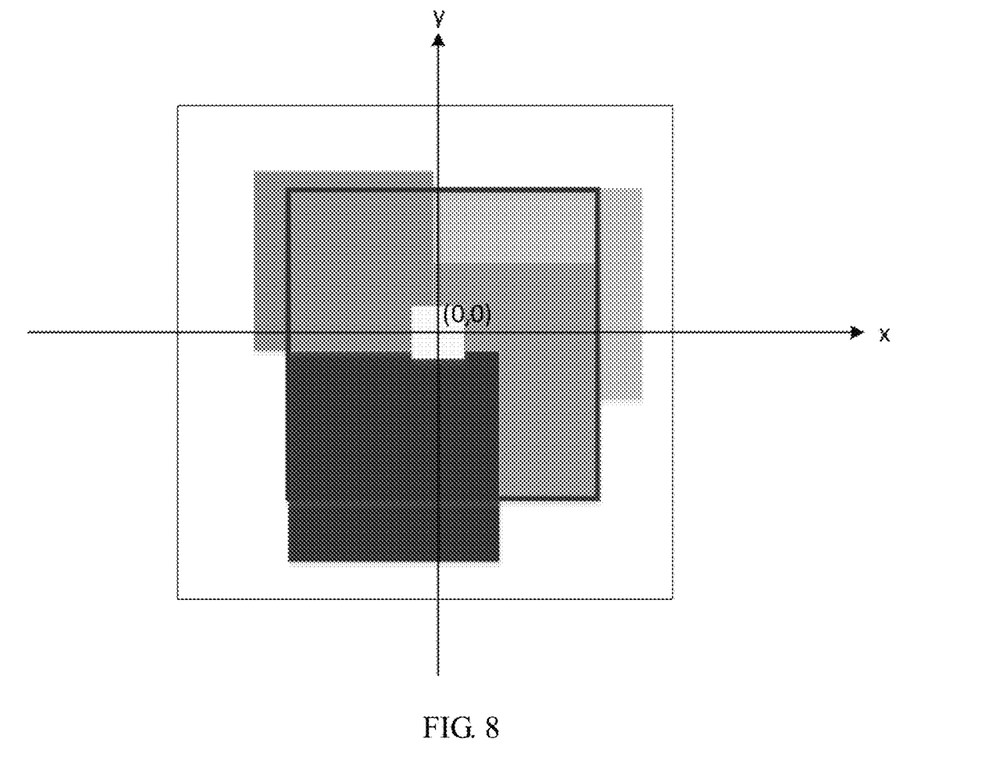
FIG. 8 is a schematic diagram of a second coordinate system according to an embodiment of the present disclosure.

In an example, in response to spaces corresponding to the plurality of original images being unoverlapped, obtaining coordinates of the annotation area in a first coordinate system of the first image by converting the coordinates of the annotation area in the plurality of original images, where, the first coordinate system takes a center of the first image as an origin; in response to spaces corresponding to two or more of the plurality of original images being overlapped, obtaining coordinates of the annotation area in a second coordinate system of the first image by converting the coordinates of the annotation area in the plurality of original images, referring to FIG. 8, the second coordinate system takes a center of overlapped/duplicate area as an origin.

When the plurality of original images have no overlapped/duplicate area, coordinates of the at least one annotation area in the plurality of original images arranged in a matrix with equal number of rows and columns can be unified in a coordinate system of one of the original images, and then the unified coordinates of the at least one annotation area in the plurality of original images are uniformly mapped to the first coordinate system. For example, the first image is formed by splicing the four original images A, B, C, and D, the original images A, B, C, and D are arranged in an order of upper left, upper right, lower left, and lower right. The coordinates of at least one annotation area in the three original images B, C, and D are unified in a coordinate system of the original image A (a coordinate system of each original image takes its upper left corner vertex as an origin). The length of each original image is w and the width is h, the coordinates ($x_A$, $y_A$) in the original image A are still ($x_A$, $y_A$), the coordinates ($x_B$, $y_B$) in the original image B are converted to ($x_B+w$, $y_B$), the coordinates ($x_C$, $y_C$) in the original image C are converted to ($x_C$, $y_C+h$), the coordinates ($x_D$, $y_D$) in the original image D are converted to ($x_D+w$, $y_D+h$).

When the plurality of original images have overlapped/duplicate areas and each of the overlapped/duplicate areas is at the edge, coordinates of at least one annotation area in the superposed plurality of original images can be unified into a coordinate system of one of the original images. And then the unified coordinates of the at least one annotation area in the plurality of original images are uniformly mapped to the second coordinate system. That is, on the basis of the above-mentioned manner of converting coordinates without overlapped/duplicate areas, the coordinates of the original images B, C, and D areas are respectively translated with the upper left vertex of the original image A area as the coordinate center, and the pixel value of the translation is the pixel value of the overlapped/duplicate area.

In step S702, coordinates of the annotation area in the third image are obtained by converting the coordinates of the annotation area in the first image.

In a process of scaling the first image to the third image according to the scaling ratio, the first image is scaled based on the center of the first image or the center of the overlapped/duplicate area as the base point. Therefore, in the scaling process of the first image, the first coordinate system and the second coordinate system are also synchronously scaled, and the coordinate points in the coordinate system are scaled simultaneously. Thus only the coordinates in the first image need to be scaled according to the scaling ratio, the coordinates in the third image can be obtained.

In step S703, coordinates of the annotation area in the second image are obtained by converting the coordinates of the annotation area in the third image.

Figure 9:
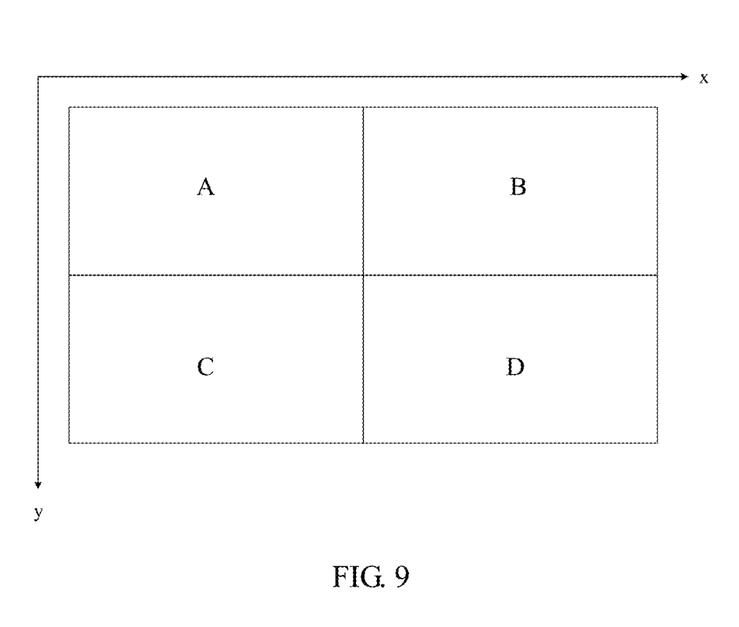
FIG. 9 is a schematic diagram of a third coordinate system according to an embodiment of the present disclosure.

Cropping the third image or padding the third image is performed in the circumferential direction of the third image, and does not affect the coordinate positions of the first coordinate system scaled and the second coordinate system scaled in the third image. In an example, coordinates of the annotation area in a third coordinate system are obtained by converting coordinates of the annotation area in the first coordinate system scaled or the second coordinate system scaled. Referring to FIG. 9, the third coordinate system takes an upper left corner of the second image as an origin. That is to say, when the operation of cropping or padding is completed, the first coordinate system or the second coordinate system with the center point as the coordinate origin is converted into the coordinate system with the upper left corner as the origin, which is unified with the coordinate system of the original images into the same coordinate system.

In the embodiments of the present disclosure, the at least one annotation area in the original images is converted into the second image through the coordinate conversion. That is, the second image is not only annotated with respective labels of the at least one annotation area, but also annotated with respective positions of the at least one annotation area, and the annotation quality of the second image is further improved.

The embodiments of the present disclosure provide a method of training an image recognition network, including: training the image recognition network using an image training set, where images in the image training set are processed using the methods of processing an image described above.

The embodiments of the present disclosure provide a method of recognizing an image, including: recognizing an image by using an image recognition network, where the image recognition network is trained using the training method described above.

Figure 10:
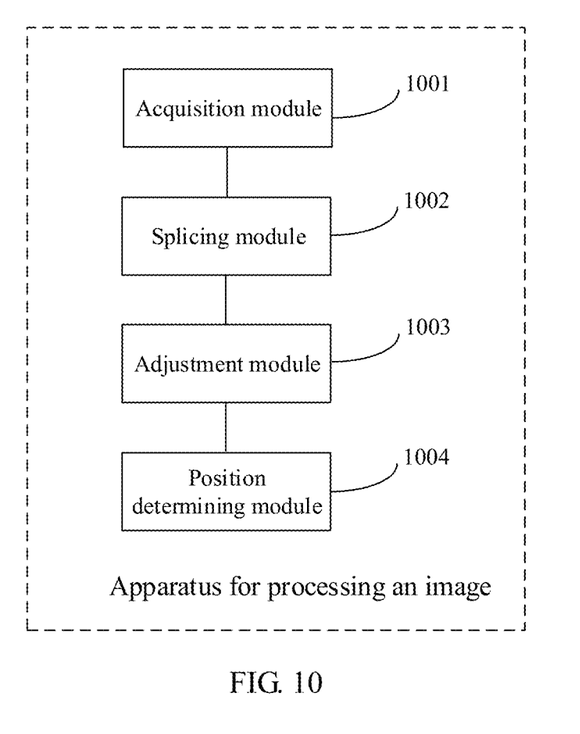
FIG. 10 is a structural schematic diagram of an apparatus for processing an image according to an embodiment of the present disclosure.

Please refer to FIG. 10, an embodiment of the present disclosure provides an apparatus for processing an image, including: an acquisition module 1001, configured to obtain a plurality of original images from an original image set, where at least one of the plurality of original images includes an annotation area; a splicing module 1002, configured to obtain at least one first image by splicing the plurality of original images; an adjustment module 1003, configured to for each of the at least one first image, adjust a shape and/or size of the first image based on the plurality of original images to form a second image; a position determining module 1004, configured to obtain respective positions of the at least one annotation area in the second image by converting respective positions of the at least one annotation area in the plurality of original images.

In some embodiments of the present disclosure, the original image set includes a plurality of process subsets, each of the process subsets includes a plurality of type nodes, each of the type nodes includes a multitude of original images, and annotation areas of original images in each of the type nodes are annotated with labels corresponding to the type node; the acquisition module is configured to: obtain the plurality of original images from a same type node in a same process subset, or obtain the plurality of original images from different type nodes in a same process subset, or obtain the plurality of original images from same type of type nodes in different process subsets.

In some embodiments of the present disclosure, original images in one type node of each of the process subsets are unannotated images.

In some embodiments of the present disclosure, the acquisition module is configured to obtain $N^2$ original images, where N is an integer greater than or equal to 2.

In some embodiments of the present disclosure, the splicing module is configured to: in response to spaces corresponding to the plurality of original images being unoverlapped, form the at least one first image by arranging the plurality of original images into N rows and N columns and splicing; in response to spaces corresponding to two or more of the plurality of original images being overlapped, form the at least one first image by superposing duplicate areas of the two or more of the plurality of original images.

In some embodiments of the present disclosure, the adjustment module is configured to: determine a scaling ratio of an annotation area in the plurality of original images and an annotation area in the second image according to a parameter of an image acquisition device corresponding to the plurality of original images and a parameter of an image acquisition device corresponding to the second image; scale the first image based on the scaling ratio to form a third image; adjust a shape and/or size of the third image to be consistent with those of the plurality of original images to form the second image.

In some embodiments of the present disclosure, when adjusting the shape and/or size of the third image to be consistent with those of the plurality of original images to form the second image, the adjustment module is configured to: pad the third image and/or crop the third image to form the second image in a shape and size consistent with the plurality of original images.

In some embodiments of the present disclosure, the position determining module is configured to: for each of the at least one annotation area, obtain coordinates of the annotation area in the first image by converting coordinates of the annotation area in the plurality of original images; obtain coordinates of the annotation area in the third image by converting the coordinates of the annotation area in the first image; obtain coordinates of the annotation area in the second image by converting the coordinates of the annotation area in the third image.

In some embodiments of the present disclosure, when obtaining the coordinates of the annotation area in the first image by converting the coordinates of the annotation area in the plurality of original images, the position determining module is configured to: in response to spaces corresponding to the plurality of original images being unoverlapped, obtain coordinates of the annotation area in a first coordinate system of the first image by converting the coordinates of the annotation area in the plurality of original images, where, the first coordinate system takes a center of the first image as an origin; in response to spaces corresponding to two or more of the plurality of original images being overlapped, obtain coordinates of the annotation area in a second coordinate system of the first image by converting the coordinates of the annotation area in the plurality of original images, where, the second coordinate system takes a center of duplicate area as an origin.

In some embodiments of the present disclosure, when obtaining the coordinates of the annotation area in the second image by converting the coordinates of the annotation area in the third image, the position determining module is configured to: obtain coordinates of the annotation area in a third coordinate system by converting coordinates of the annotation area in the first coordinate system scaled or the second coordinate system scaled, where the third coordinate system takes an upper left corner of the second image as an origin.

An embodiment of the present disclosure provides an apparatus for training an image recognition network, including: a training module configured to train the image recognition network using an image training set, where images in the image training set are processed using the methods of processing an image described above.

An embodiment of the present disclosure provides an apparatus for recognizing an image, including: a recognition module, configured to recognize an image by using an image recognition network, where the image recognition network is trained using the training method described above.

With respect to the apparatuses in the foregoing embodiments, the specific manner in which each module performs operations has been described in detail in the foregoing embodiments of the methods, and will not be elaborated here.

Figure 11:
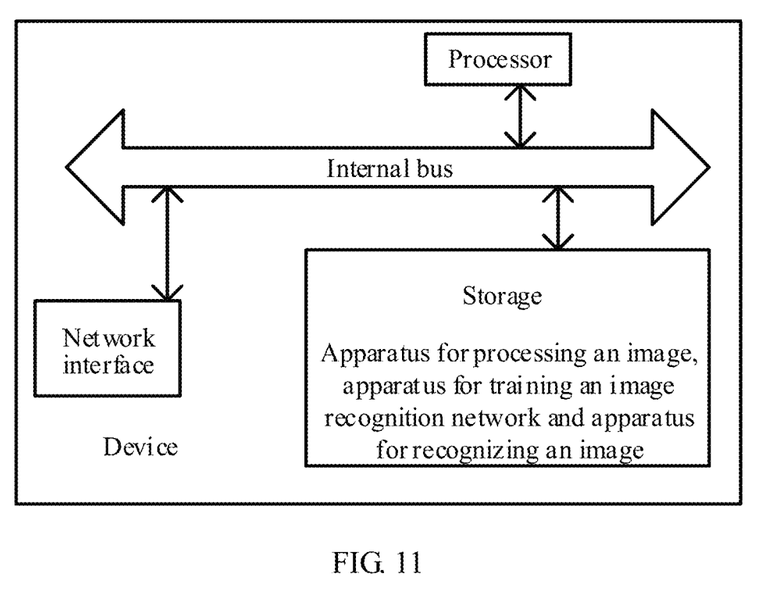
FIG. 11 is a structural schematic diagram of an electronic device according to an embodiment of the present disclosure.

Referring to FIG. 11, an embodiment of the present disclosure provides a device including a memory and a processor. The memory is configured to store computer instructions executable on the processor. The processor is configured to execute the computer instructions to process an image, train an image recognition network, or recognize an image based on the above-described methods.

An embodiment of the present disclosure provides a non-volatile computer-readable storage medium having a computer program stored thereon, where when the program is executed by a processor to implement the methods as described above.

In the present disclosure, the terms "first" and "second" are used for descriptive purposes only, and cannot be understood to indicate or imply relative importance. The term "plurality" refers to two or more than two unless expressly defined otherwise.

Other embodiments of the present disclosure will readily occur to those skilled in the art upon consideration of the description and practice of the disclosure disclosed herein. The present disclosure is intended to cover any variation, use or adaptive variation of the present disclosure that follows the general principles of the present disclosure and includes common general knowledge or customary technical means in the art not disclosed in the present disclosure. The description and examples are to be regarded as exemplary only, with the true scope and spirit of the disclosure being indicated by the following claims.

It should be understood that the present disclosure is not limited to the precise structures already described above and shown in the drawings, and that various modifications and changes may be made without departing from the scope thereof. The scope of the present disclosure is limited only by the appended claims.

What is claimed is:

1. A method of processing an image, comprising:
obtaining a plurality of original images from an original image set, wherein at least one of the plurality of original images comprises an annotation area;
obtaining at least one first image by splicing the plurality of original images;
for each of the at least one first image,
adjusting a shape and/or size of the first image based on the plurality of original images to form a second image;
obtaining respective positions of the at least one annotation area in the second image by converting respective positions of the at least one annotation area in the plurality of original images;
wherein adjusting the shape and/or size of the first image based on the plurality of original images to form the second image comprises:
determining a scaling ratio of an annotation area in the plurality of original images and an annotation area in the second image according to a parameter of an image acquisition device corresponding to the plurality of original images and a parameter of an image acquisition device corresponding to the second image;
scaling the first image based on the scaling ratio to form a scaled first image; and
adjusting a shape and/or size of the scaled first image to be consistent with those of the plurality of original images to form the second image;
wherein obtaining respective positions of the at least one annotation area in the second image by converting respective positions of the at least one annotation area in the plurality of original images comprises:
for each of the at least one annotation area,
obtaining coordinates of the annotation area in the first image by converting coordinates of the annotation area in the plurality of original images;
obtaining coordinates of the annotation area in the scaled first image by converting the coordinates of the annotation area in the first image; and
obtaining coordinates of the annotation area in the second image by converting the coordinates of the annotation area in the scaled first image;
wherein obtaining the coordinates of the annotation area in the first image by converting the coordinates of the annotation area in the plurality of original images comprises:
in response to spaces corresponding to the plurality of original images being unoverlapped, obtaining coordinates of the annotation area in a first coordinate system of the first image by converting the coordinates of the annotation area in the plurality of original images, wherein, the first coordinate system takes a center of the first image as an origin;
in response to spaces corresponding to two or more of the plurality of original images being overlapped, obtaining coordinates of the annotation area in a second coordinate system of the first image by converting the coordinates of the annotation area in the plurality of original images, wherein, the second coordinate system takes a center of duplicate area as an origin.

2. The method according to claim 1, wherein the original image set comprises a plurality of process subsets, each of the process subsets comprises a plurality of type nodes, each of the type nodes comprises a multitude of original images, and annotation areas of original images in each of the type nodes are annotated with labels corresponding to the type node; and
obtaining the plurality of original images from the original image set comprises:
obtaining the plurality of original images from a same type node in a same process subset, or
obtaining the plurality of original images from different type nodes in a same process subset, or
obtaining the plurality of original images from same type of type nodes in different process subsets.

3. The method according to claim 2, wherein original images in one type node of each of the process subsets are unannotated images.

4. The method according to claim 1, wherein obtaining the plurality of original images from the original image set comprises:
obtaining $N^2$ original images, wherein N is an integer greater than or equal to 2.

5. The method according to claim 4, wherein obtaining the at least one first image by splicing the plurality of original images comprises:
in response to spaces corresponding to the plurality of original images being unoverlapped, forming the at least one first image by arranging the plurality of original images into N rows and N columns and splicing;
in response to spaces corresponding to two or more of the plurality of original images being overlapped, forming the at least one first image by superposing duplicate areas of the two or more of the plurality of original images.

6. A method of training an image recognition network, comprising: training the image recognition network using an image training set, wherein images in the image training set are processed using the method of processing an image according to claim 1.

7. A method of recognizing an image, comprising: recognizing an image by using an image recognition network, wherein the image recognition network is trained using the training method according to claim 6.

8. The method according to claim 1, wherein adjusting the shape and/or size of the scaled first image to be consistent with those of the plurality of original images to form the second image comprises:
padding the scaled first image and/or cropping the scaled first image to form the second image in a shape and size consistent with the plurality of original images.

9. The method according to claim 1, wherein obtaining the coordinates of the annotation area in the second image by converting the coordinates of the annotation area in the scaled first image comprises:
obtaining coordinates of the annotation area in a third coordinate system by converting coordinates of the annotation area in the first coordinate system scaled or the second coordinate system scaled, wherein the third coordinate system takes an upper left corner of the second image as an origin.

10. A device comprising:
a memory, and
a processor,
wherein the memory is configured to store computer instructions executable on the processor, and the processor is configured to execute the computer instructions to implement:

obtaining a plurality of original images from an original image set, wherein at least one of the plurality of original images comprises an annotation area;

obtaining at least one first image by splicing the plurality of original images;

for each of the at least one first image,
- adjusting a shape and/or size of the first image based on the plurality of original images to form a second image;
- obtaining respective positions of the at least one annotation area in the second image by converting respective positions of the at least one annotation area in the plurality of original images;

wherein adjusting the shape and/or size of the first image based on the plurality of original images to form the second image comprises:
- determining a scaling ratio of an annotation area in the plurality of original images and an annotation area in the second image according to a parameter of an image acquisition device corresponding to the plurality of original images and a parameter of an image acquisition device corresponding to the second image;
- scaling the first image based on the scaling ratio to form a scaled first image; and
- adjusting a shape and/or size of the scaled first image to be consistent with those of the plurality of original images to form the second image;

wherein obtaining respective positions of the at least one annotation area in the second image by converting respective positions of the at least one annotation area in the plurality of original images comprises:
for each of the at least one annotation area,
- obtaining coordinates of the annotation area in the first image by converting coordinates of the annotation area in the plurality of original images;
- obtaining coordinates of the annotation area in the scaled first image by converting the coordinates of the annotation area in the first image; and
- obtaining coordinates of the annotation area in the second image by converting the coordinates of the annotation area in the scaled first image;

wherein obtaining the coordinates of the annotation area in the first image by converting the coordinates of the annotation area in the plurality of original images comprises:
- in response to spaces corresponding to the plurality of original images being unoverlapped, obtaining coordinates of the annotation area in a first coordinate system of the first image by converting the coordinates of the annotation area in the plurality of original images, wherein, the first coordinate system takes a center of the first image as an origin;
- in response to spaces corresponding to two or more of the plurality of original images being overlapped, obtaining coordinates of the annotation area in a second coordinate system of the first image by converting the coordinates of the annotation area in the plurality of original images, wherein, the second coordinate system takes a center of duplicate area as an origin.

11. The device according to claim 10, wherein the original image set comprises a plurality of process subsets, each of the process subsets comprises a plurality of type nodes, each of the type nodes comprises a multitude of original images, and annotation areas of original images in each of the type nodes are annotated with labels corresponding to the type node; and obtaining the plurality of original images from the original image set comprises:
- obtaining the plurality of original images from a same type node in a same process subset, or
- obtaining the plurality of original images from different type nodes in a same process subset, or
- obtaining the plurality of original images from same type of type nodes in different process subsets.

12. The device according to claim 10, wherein obtaining the plurality of original images from the original image set comprises:
obtaining $N^2$ original images, wherein N is an integer greater than or equal to 2.

13. The device according to claim 12, wherein obtaining the at least one first image by splicing the plurality of original images comprises:
- in response to spaces corresponding to the plurality of original images being unoverlapped, forming the at least one first image by arranging the plurality of original images into N rows and N columns and splicing;
- in response to spaces corresponding to two or more of the plurality of original images being overlapped, forming the at least one first image by superposing duplicate areas of the two or more of the plurality of original images.

14. The device according to claim 10, wherein adjusting the shape and/or size of the scaled first image to be consistent with those of the plurality of original images to form the second image comprises:
padding the scaled first image and/or cropping the scaled first image to form the second image in a shape and size consistent with the plurality of original images.

15. A non-transitory computer readable storage medium having a computer program stored thereon, wherein when the program is executed by a processor to implement:
obtaining a plurality of original images from an original image set, wherein at least one of the plurality of original images comprises an annotation area;
obtaining at least one first image by splicing the plurality of original images;
for each of the at least one first image,
- adjusting a shape and/or size of the first image based on the plurality of original images to form a second image;
- obtaining respective positions of the at least one annotation area in the second image by converting respective positions of the at least one annotation area in the plurality of original images;

wherein adjusting the shape and/or size of the first image based on the plurality of original images to form the second image comprises:
- determining a scaling ratio of an annotation area in the plurality of original images and an annotation area in the second image according to a parameter of an image acquisition device corresponding to the plurality of original images and a parameter of an image acquisition device corresponding to the second image;
- scaling the first image based on the scaling ratio to form a scaled first image; and
- adjusting a shape and/or size of the scaled first image to be consistent with those of the plurality of original images to form the second image;

wherein obtaining respective positions of the at least one annotation area in the second image by converting respective positions of the at least one annotation area in the plurality of original images comprises:
for each of the at least one annotation area,
obtaining coordinates of the annotation area in the first image by converting coordinates of the annotation area in the plurality of original images;
obtaining coordinates of the annotation area in the scaled first image by converting the coordinates of the annotation area in the first image; and
obtaining coordinates of the annotation area in the second image by converting the coordinates of the annotation area in the scaled first image;
wherein obtaining the coordinates of the annotation area in the first image by converting the coordinates of the annotation area in the plurality of original images comprises:

in response to spaces corresponding to the plurality of original images being unoverlapped, obtaining coordinates of the annotation area in a first coordinate system of the first image by converting the coordinates of the annotation area in the plurality of original images, wherein, the first coordinate system takes a center of the first image as an origin;

in response to spaces corresponding to two or more of the plurality of original images being overlapped, obtaining coordinates of the annotation area in a second coordinate system of the first image by converting the coordinates of the annotation area in the plurality of original images, wherein, the second coordinate system takes a center of duplicate area as an origin.

* * * * *